(12) United States Patent
Chambonneau et al.

(10) Patent No.: US 9,188,173 B2
(45) Date of Patent: Nov. 17, 2015

(54) ROTATION TRANSMISSION DEVICE WITH BUILT-IN ONE-WAY CLUTCH AND ALTERNATOR COMPRISING SUCH A DEVICE

(71) Applicant: Aktiebolaget SKF, Göteborg (SE)

(72) Inventors: Charles Chambonneau, Joué lès Tours (FR); François Champalou, Chaumont-sur-Loire (FR); Richard Corbett, Fondettes (FR); Jeremy Detraigne, Chauvigny (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/285,989

(22) Filed: May 23, 2014

(65) Prior Publication Data

US 2014/0346000 A1     Nov. 27, 2014

(30) Foreign Application Priority Data

May 23, 2013   (EP) .................................... 13305662

(51) Int. Cl.
*F16D 41/064*     (2006.01)
*F16D 41/067*     (2006.01)

(52) U.S. Cl.
CPC ............ *F16D 41/064* (2013.01); *F16D 41/067* (2013.01)

(58) Field of Classification Search
None
See application file for complete search history.

(56) References Cited

U.S. PATENT DOCUMENTS 5,931,755 A * 8/1999 Mailey et al. ............... 474/161
2002/0100653 A1 * 8/2002 Ouchi ............................ 192/45

FOREIGN PATENT DOCUMENTS

| DE | 102010008935 A1 | 8/2011 |
| JP | 2006336771 A | 12/2006 |
| JP | 2008267553 A | 11/2008 |

* cited by examiner

*Primary Examiner* — Ramya Burgess
*Assistant Examiner* — Timothy M Hannon
(74) *Attorney, Agent, or Firm* — Bryan Peckjian; SKF USA Inc. Patent Dept.

(57) ABSTRACT

A rotation transmission device with a built-in one-way clutch having an inside rotational member, an outside rotational member disposed concentrically with the inside rotational member is proposed. The device includes a one-way clutch that is radially disposed in an annular space defined between the inside rotational member and the outside rotational member, and at least one bearing disposed in the said annular space. The outside rotational member is made in a plastic material and is overmolded onto at least one stiffening insert.

11 Claims, 2 Drawing Sheets

ROTATION TRANSMISSION DEVICE WITH BUILT-IN ONE-WAY CLUTCH AND ALTERNATOR COMPRISING SUCH A DEVICE

CROSS-REVERENCE TO RELATED APPLICATIONS

This application claims priority to European Patent Application No. EP13305662 filed May 23, 2013, which is hereby fully incorporated by reference in its entirety.

FIELD OF THE INVENTION

The invention relates to a rotation-transmitting apparatus with a built-in one-way clutch, for example a pulley for an alternator of an automotive vehicle. The invention also concerns an alternator comprising such a rotation-transmitting apparatus.

BACKGROUND OF THE INVENTION

As is known, a transmission belt drives an outer crown of a pulley alternator, driving an internal hub. This pulley is subject to speed and torque variations in service, mainly due to the engine acyclisms. There are different ways to smooth the said variations exerted on the pulley, for example by providing a one-way clutch between the hub and the pulley crown. In one rotation direction, the one-way clutch transmits a torque from the hub to the pulley crown while in the other rotation direction the pulley operates as freewheel.

The said pulley crown is generally made in metal and is rotationally supported by at least one rolling bearing comprising an inner ring, an outer ring and rolling elements between the said rings, the said rolling bearing parts being made in metal. The rotation transmission device comprising such elements has a weight generating an important inertia.

Moreover, a metallic pulley crown necessitates thermal coatings for preventing corrosion or improving the hardness, for example. Such surface treatments are expensive and increase the rotation transmission device manufacturing cost.

It is therefore a particular object of the present invention to overcome these aforementioned drawbacks by providing a rotation transmission device of simple design that is easy to assemble, economical, able to operate for a long time in both an effective and an economic manner.

SUMMARY OF THE INVENTION

The invention concerns a rotation transmission device with a built-in one-way clutch comprising an inside rotational member, an outside rotational member disposed concentrically with the inside rotational member, a one-way clutch radially disposed in an annular space defined between the inside rotational member and the outside rotational member, and at least one bearing disposed in the said annular space.

According to the invention, the outside rotational member is made in a plastic material and is overmoulded onto at least one stiffening insert.

Thanks to this invention, the rotation transmission device weight is highly reduced enabling a device cost reduction, in particular reduced material, quantity and manufacturing costs.

The saved device weight implies also a reduced inertia and enhances climbing performance at device starts and stops.

According to further aspects of the invention, which are advantageous but not compulsory, such a rolling bearing may incorporate one or several of the following features as long as there is no contradiction:

- The bearing is a rolling bearing comprising rolling elements mounted in a rolling chamber defined between an inner ring and an outer ring.
- The bearing is a sliding bearing.
- The rolling elements of the at least one rolling bearing are balls.
- The rolling elements are circumferentially equally spaced by a cage.
- The at least one stiffening element comprises axial retaining means that cooperate with the overmoulding outside rotational member.
- The at least one stiffening element comprises radial retaining means that cooperate with the overmoulding outside rotational member.
- The at least one stiffening element comprises rotational retaining means that cooperate with the overmoulding outside rotational member.
- The inner ring of the at least one bearing is made from a stamped metal sheet.
- The inner ring of the at least one bearing comprises a toroidal portion forming a raceway for the rolling elements, and an axial portion axially extending from the toroidal portion.
- The axial portion of the inner ring of the at least one bearing is press fitted onto an outside cylindrical surface of the inside rotational member.
- The outer ring of the at least one bearing is made from a stamped metal sheet.
- The outer ring of the at least one bearing comprises a toroidal portion forming a raceway for the rolling elements.
- The outer ring of the at least one bearing comprises at least one axial portion axially extending from the toroidal portion.
- At least one seal is mounted onto the at least one axial portion of the outer ring of the at least one bearing, the said seal being radially directed towards the inner ring and/or the inside rotational member.
- The outer ring of the at least one bearing consists in one stiffening insert of the outside rotational member, such as the said outside rotational member is overmoulded onto the said outer ring, the raceway for the rolling elements being opened to the annular space.
- The outer ring of the at least one bearing comprises a second toroidal portion extending from the toroidal portion forming a raceway for the rolling elements, the said second toroidal portion defining an additional radial space for the cage.
- The one-way clutch comprises sliding elements radially disposed between two raceways, at least one of the raceways being formed onto a ring.
- The sliding elements of the one-way clutch are sprags.
- The sliding elements of the one-way clutch are rollers.
- The sliding elements of the one-way clutch are circumferentially spaced by a cage.
- The one-way clutch comprises an inner ring mounted onto an outer cylindrical surface of the inside rotational member and forming a raceway for the sliding elements, the said inner ring being made from a stamped metal sheet.
- The outer cylindrical surface of the inside rotational member forms a raceway for the sliding elements of the one-way clutch.

The one-way clutch comprises an outer ring mounted into a bore of the outside rotational member and forming a raceway for the sliding elements, the said outer ring being made from a stamped metal sheet.

The outer ring of the one-way clutch consists in one stiffening insert of the outside rotational member, such as the said outside rotational member is overmoulded onto the said outer ring, the raceway for the sliding elements being opened to the annular space.

The outer cylindrical surface of the stiffening insert is provided with axial ribs dedicated to be overmoulded by the outside rotational member and forming rotational retaining means.

The outer ring of the one-way clutch and the outer ring of at least one rolling bearing are axially spaced by a radial annular portion of the outside rotational member forming axial retaining means, the said radial annular portion being manufactured during the overmoulding process.

The outer ring of the one-way clutch and the outer ring of the at least one bearing form one unique outer ring consisting in one stiffening insert of the outside rotational member, the said unique ring being provided with one raceway for the sliding elements of the one-way clutch and at least one raceway for the rolling elements of the at least one bearing.

The outside rotational member comprises radial pins cooperating with radial openings of the unique stiffening insert and forming an axial retaining means.

The outside rotational member is overmoulded onto the outer ring of the one-way clutch and/or of the at least one rolling bearing so as to form shoulders in order to axially maintain the free ends of the said outer ring.

The diameter of the raceway for the sliding elements of the one-way clutch is strictly smaller than the diameter of the raceway for the rolling elements of the at least one rolling bearing.

The rotation transmission device comprises two adjacent bearings.

The rotation transmission device comprises two bearings axially located on each side of the one-way clutch.

The outside rotational member is made from a polymer material, for example in Polyamide 46 (PA46) or Phenol Formaldehyde Resin (PF).

The outside rotational member is made from a polymer material comprising glass fiber, for example at least 30% of glass fiber.

The raceways of the rolling and/or sliding elements are thermal treated, for example by inductive hardening, through hardening, case hardening, nitrocarburazing.

The present invention also concerns an alternator comprising a rotation transmission device according to any of the preceding embodiments.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
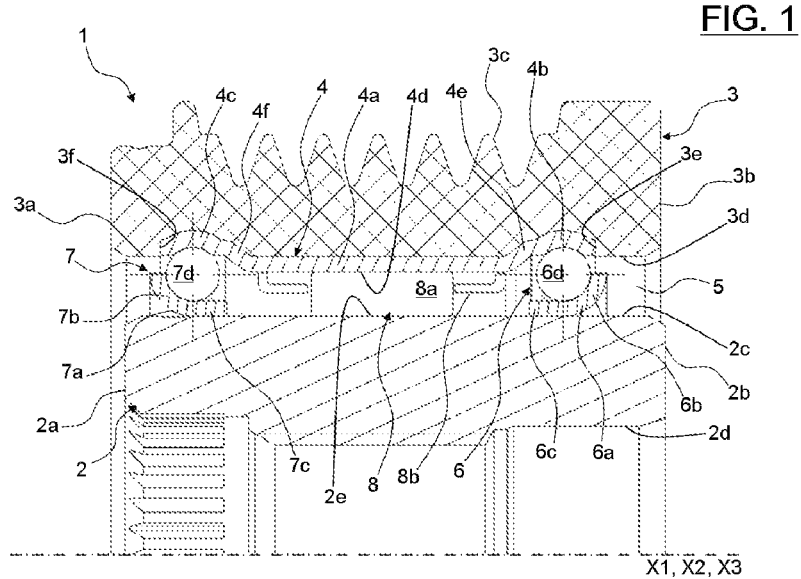
FIG. 1 is a half cross section of a rotation transmission device according to a first embodiment of the invention.

As illustrated in FIG. 1, a rotation transmission device 1 of central axis X1 comprises an inside rotational member 2 of central axis X2, for example a hub, and an outside rotation member 3 of central axis X3, for example a pulley crown.

In normal use, the axis X1, X2 and X3 are coincident and the inside rotational member 2 and the outside rotational member 3 are in relative rotation around these axis.

In this embodiment and the following ones, the terms "axial" and "radial" are defined in relation to the rotation axis X1 of the rotation transmission device 1. Then an axial portion is parallel to this axis of rotation and a radial portion is perpendicular to this axis.

The inside rotational member 2 comprises two lateral flanges 2a, 2b, an outer cylindrical surface 2c and an inner bore 2d. A shaft (not represented) is dedicated to be inserted into the inner bore 2d in order to transmit a torque to the inside rotational member.

The outside rotational member 3 comprises two lateral flanges 3a, 3b, an outer surface 3c designed to cooperate with a belt (not illustrated) and an inner bore 3d. The outer surface 3c comprises annular ribs to cooperate with a belt of the poly-V type for example.

According to the invention the outside rotational member 3 comprises a stiffening insert 4. The outside rotational member 3 is made from a polymer material and is overmoulded onto the said stiffening insert 4.

Thanks to the invention, the outside rotational member can be manufactured from a lighter material than the usual metallic rotational members, enabling weight saving for the rotation transmission device 1.

The stiffening of the outside rotational member 3 is ensured by the stiffening insert 4 for supporting loads and torque.

The outside rotational member 3 is disposed concentrically with the inside rotational member 2 such as the inner bore 3d and the outer cylindrical surface 2c defines an annular space 5 wherein two rolling bearings 6, 7 and a one-way clutch 8 are mounted.

The rolling bearings 6, 7 are axially disposed on each side of the one-way clutch 8. The two rolling bearings 6, 7 are similar and symmetrical with respect to a radial axis passing through the centre of the one-way-clutch.

The rolling bearings 6, 7 are radially disposed between the inner bore 3d of the outside rotational member 3 and the outer cylindrical surface 2c of the inside rotational member 2.

The rolling bearings 6, 7 comprise each an inner ring 6a, 7a and one row of rolling elements 6d, 7d, here balls. The inner rings 6a, 7a comprise each a toroidal portion 6b, 7b defining an outer concave portion forming a raceway for the rolling elements 6d, 7d. The toroidal portion 6b, 7b are each extended by an axial portion 6c, 7c being mounted by press-fitting onto the outer cylindrical surface 2c of the outside rotational member 2.

The inner rings 6a, 7a are made from a stamped metal sheet.

The one-way clutch comprises sliding elements 8a, such as sprags, which are circumferentially maintained by a cage 8b. The outer cylindrical surface 2c of the inside rotational member 2 comprises an axial portion 2e forming a raceway for the sliding elements 8a. As an alternative not represented, the one-way clutch 8 may comprise an inner ring mounted onto the outer cylindrical surface 2c of the inside rotational member 2.

According to one embodiment of the invention, the rolling bearings 6, 7 and the one-way clutch also comprises a common unique outer ring consisting in the stiffening insert 4.

The outer ring 4 comprises an axial portion 4a axially extended on one side by a first toroidal portion 4b and axially extended on the other side by a second toroidal portion 4c.

The inner concave surface of the first toroidal portion 4b forms a raceway for the rolling elements 6d of the rolling bearing 6. The inner concave surface of the second toroidal portion 4c forms a raceway for the rolling elements 7d of the rolling bearing 7. The axial inner surface of the axial portion 4a forms a raceway for the sliding elements 8a of the one-way clutch 8.

As shown in the example of FIG. 1, a toroidal portion 4e is disposed between the first toroidal portion 4b and the axial portion 4a, and another toroidal portion 4f is disposed between the second toroidal portion 4c and the axial portion 4a. Such toroidal portions 4e, 4f enables an increased radial space for a cage (not represented) for the rolling elements 6d, 7d.

The outside rotational member 3 is overmoulded onto the said outer ring 4 so as to form shoulders 3e, 3f in order to axially maintain the free ends of the toroidal portions 4b, 4c respectively.

The diameter of the raceways on the outer ring 4 for the rolling elements 6d, 7d is strictly higher than the diameter of the raceway on the outer ring 4 for the sliding elements 8a. Such a design permits an easy axial insertion of the rolling and sliding elements.

Figure 2:
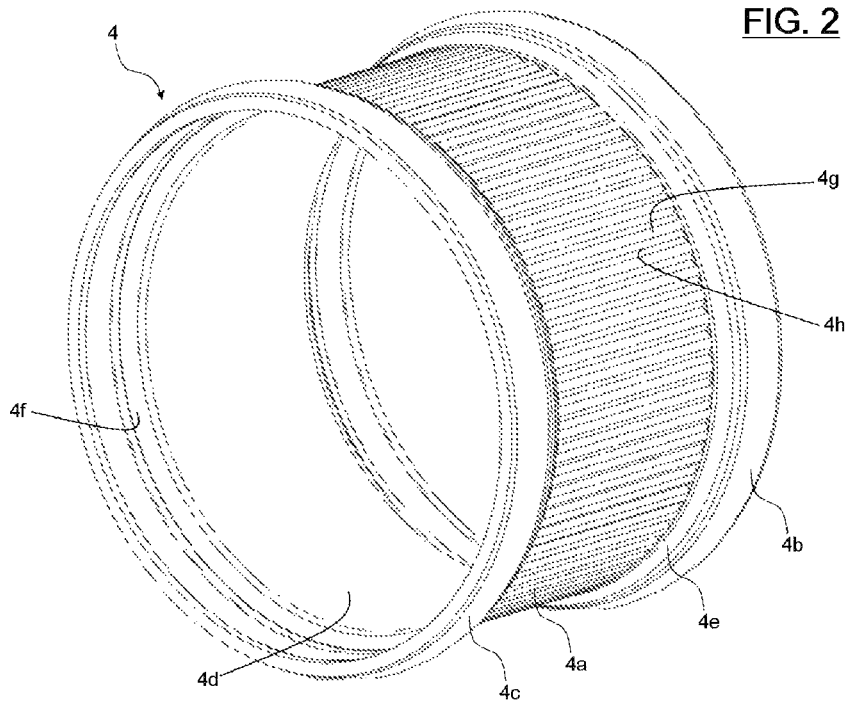
FIG. 2 is a perspective view of a unique outer ring for the rotation transmission device according to a second embodiment of the invention.

In one embodiment of the invention as illustrated in FIG. 2, the outer cylindrical surface of the axial portion 4a of the outer ring 4 comprises radial ribs 4g alternated with recesses 4h. The ribs 4g are all similar and circumferentially equally spaced. The ribs 4g and the recesses 4h cooperate with concordant forms of the outside rotational member 3 which is overmoulded onto the said ribs 4g and recesses 4h. Such forms permit to block any rotation between the outer ring 4 and the overmoulding member 3.

Figure 3:
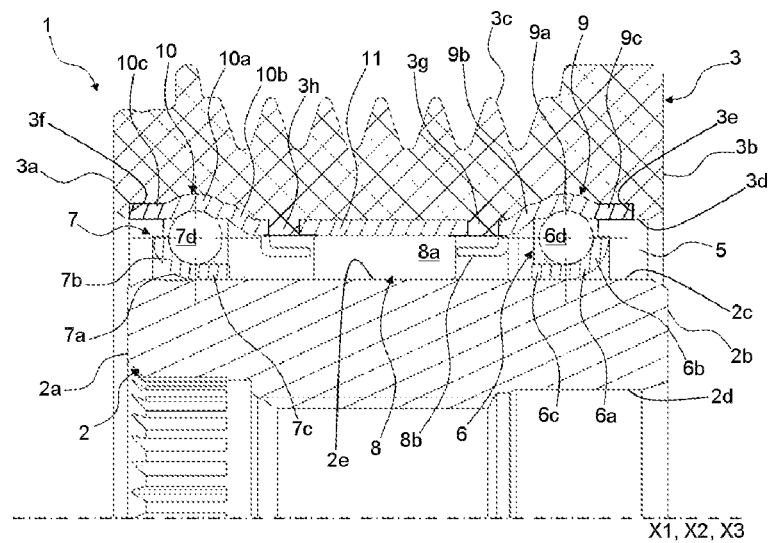
FIG. 3 is a half cross section of a rotation transmission device according to a third embodiment of the invention.

Another embodiment illustrated in FIG. 3, in which identical elements bear the same references, differs from the embodiment of FIG. 1 in that the outside rotational member 3 comprises three stiffening inserts 9, 10, 11. The outside rotational member 3 is made from a polymer material and is overmoulded onto the said stiffening inserts 9, 10, 11.

According to one example illustrated in FIG. 3, the rolling bearings 6, 7 each comprise an outer ring that consists in the stiffening inserts 9, 10 respectively.

The outer rings 9, 10 each comprises a first toroidal portion a axially extended 9a, 10a, a second toroidal portion 9b, 10b axially extending from the first toroidal portion 9a, 10a on one side, an axial portion 9c, 10c axially extending from the first toroidal portion 9a, 10a on the other side, respectively.

The inner concave surface of each of the first toroidal portions 9a, 10a form a raceway for the rolling elements 6d, 7d of the rolling bearing 6, 7 respectively.

The second toroidal portions 9b, 10b enable an increased radial space for a cage (not represented) for the rolling elements 6d, 7d.

The axial portions 9c, 10c may be each provided with at least one seal (not represented), the said seal being radially directed towards the axis X1. Such seals permit to prevent the entry of pollution into the annular space 5 and to prevent leakage of lubricant to the outside for the rolling bearings 6, 7 and the one-way clutch 8.

According to one example illustrated in FIG. 3, the one-way clutch 8 comprises an outer ring that consists in the stiffening insert 11.

The outer ring 11 is cylindrical and comprises an inner surface forming a raceway for the sliding elements 8a.

The outer ring 11 of the one-way clutch 8 is axially located between the two outer rings 9, 10 of the rolling bearings 6, 7 respectively.

According to one example illustrated in FIG. 3, an axial gap is defined between the adjacent outer rings 9 and 11 and between the adjacent outer rings 10 and 11.

During the overmoulding process for manufacturing the outside rotational member 3, the said axial gaps between two adjacent outer rings are filled in by two annular radial portions 3g, 3h that radially extends from the inner bore 3d of the outside rotational member 3. Such annular radial portions 3g, 3h permits to axially maintain the outer ring 11 of the one-way clutch. The annular radial portion 3g also permits to axially maintain the outer ring 9 with the shoulder 3e; and the annular radial portion 3h permits to axially maintain the outer ring 10 with the shoulder 3f.

The technical characteristics of the embodiments and alternate variations considered above may be combined.

The invention claimed is:

1. A rotation transmission device with a built-in one-way clutch comprising:
   an inside rotational member,
   an outside rotational member disposed concentrically with the inside rotational member,
   a one-way clutch including a plurality of sliding elements radially disposed in an annular space defined between the inside rotational member and the outside rotational member, and
   at least one bearing disposed in the said annular space, wherein
   the outside rotational member is made of a plastic material and is overmoulded onto at least one stiffening insert, the outside rotational member providing at least two shoulders in contact with the at least one stiffening insert to axially maintain the at least one stiffening insert, wherein a diameter of the outside rotational member is equal to a diameter of the at least one stiffening insert at an axial location of the at least two shoulders, and wherein the at least one stiffening insert forms an outer ring for the at least one bearing and the plurality of sliding elements such that the at least one stiffening insert provides an outer raceway for the at least one bearing and the plurality of sliding elements.

2. The rotation transmission device according to claim 1, wherein
   the at least one bearing further provides an inner ring, rolling elements, and
   a raceway for the rolling elements is opened to the annular space.

3. The rotation transmission device according to claim 2, wherein the plurality of sliding elements are radially disposed between two raceways, and
   a raceway for the sliding elements is opened to the annular space.

4. The rotation transmission device according to claim 3, wherein the outer raceway of the at least one bearing and the outer raceway of the plurality of sliding elements are axially spaced by a radial annular portion of the outside rotational member.

5. The rotation transmission device according to claim 3, wherein the at least one stiffening insert comprises only a single stiffening insert such that the outer raceway of the at least one bearing and the outer raceway of the plurality of sliding elements are formed in one stiffening insert of the outside rotational member.

6. The rotation transmission device according to claim 5, wherein the outer raceway of the at least one bearing is located at a first toroidal portion of the single stiffening insert, a second toroidal portion axially extending from the first toroidal portion to define an additional radial space for a cage that maintains the rolling elements.

7. The rotation transmission device according to claim 6, wherein the single stiffening insert further comprises an axial portion axially extending from the first toroidal portion.

8. The rotation transmission device according to claim 7 wherein the stiffening insert includes an outer cylindrical surface provided with axial ribs dedicated to be overmoulded by the outside rotational member.

9. The rotation transmission device according to claim 8, wherein an outer cylindrical surface of the inside rotational member forms an inner raceway for the plurality of sliding elements of the one-way clutch.

10. The rotation transmission device according to claim 9, wherein the outside rotational member is made from a polymer material comprising glass fiber.

11. An alternator comprising:
a rotation transmission device providing a built-in one-way clutch having;
an inside rotational member,
an outside rotational member disposed concentrically with the inside rotational member,
a one-way clutch including a plurality of sliding elements radially disposed in an annular space defined between the inside rotational member and the outside rotational member, and
at least one bearing disposed in the said annular space, wherein
the outside rotational member is made of a plastic material and is overmoulded onto at least one stiffening insert, the outside rotational member providing at least two shoulders in contact with the at least one stiffening insert to axially maintain the at least one stiffening insert, wherein a diameter of the outside rotational member is equal to a diameter of the at least one stiffening insert at an axial location of the at least two shoulders, and wherein the at least one stiffening insert forms an outer ring for the at least one bearing and the plurality of sliding elements such that the at least one stiffening insert provides an outer raceway for the at least one bearing and the plurality of sliding elements.

* * * * *